Oct. 14, 1941.    R. H. WHITEHEAD    2,259,188
TIMING DEVICE
Filed Feb. 8, 1939    4 Sheets-Sheet 1

INVENTOR
RICHARD H. WHITEHEAD
BY
Willis B Rice
ATTORNEY

Oct. 14, 1941.      R. H. WHITEHEAD      2,259,188
TIMING DEVICE
Filed Feb. 8, 1939      4 Sheets-Sheet 2

INVENTOR
RICHARD H. WHITEHEAD
BY
ATTORNEY

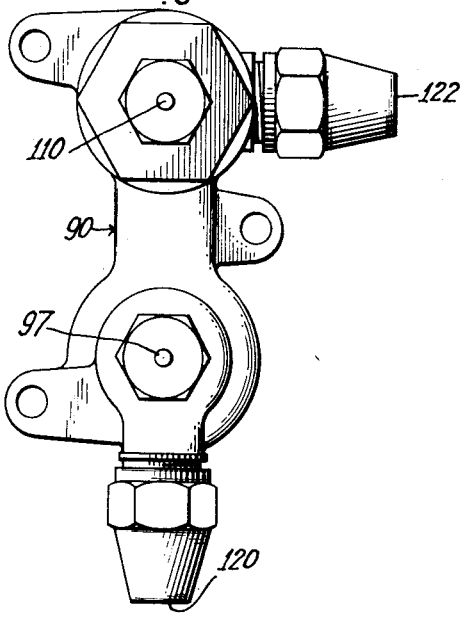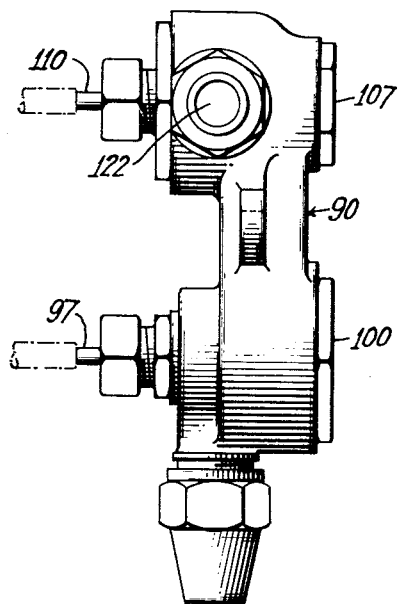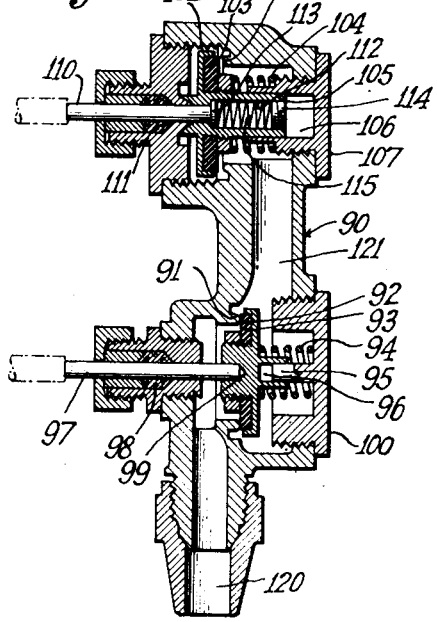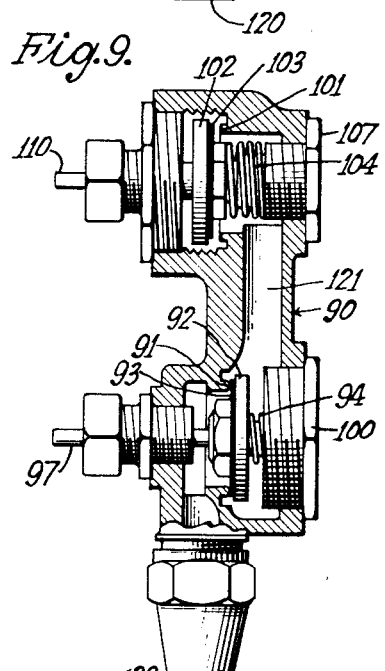

Oct. 14, 1941.   R. H. WHITEHEAD   2,259,188
TIMING DEVICE
Filed Feb. 8, 1939   4 Sheets-Sheet 4
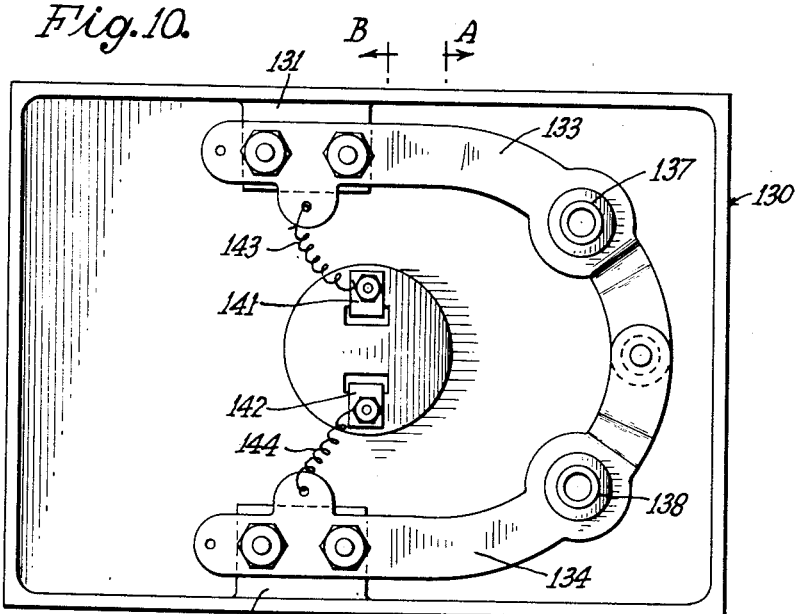
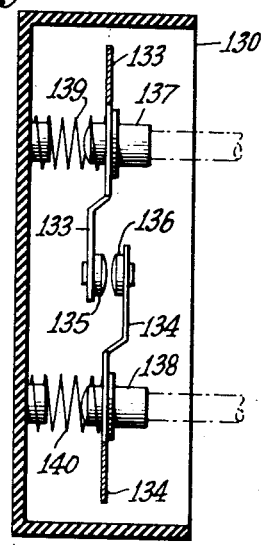
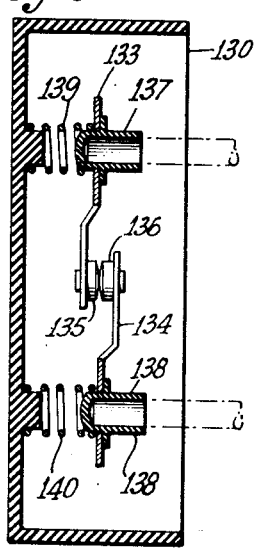
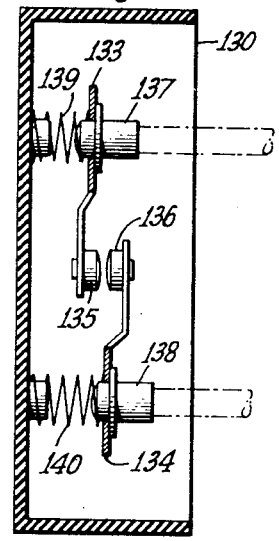
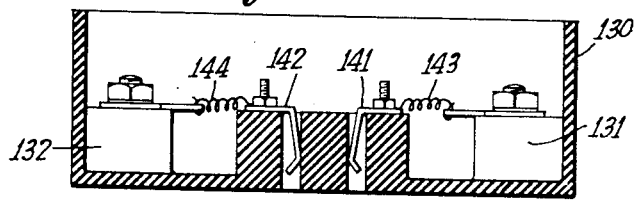
INVENTOR
RICHARD H. WHITEHEAD
BY
ATTORNEY Patented Oct. 14, 1941

2,259,188

UNITED STATES PATENT OFFICE 2,259,188

TIMING DEVICE

Richard H. Whitehead, New Haven, Conn., assignor to New Haven Clock Company, New Haven, Conn., a corporation of Connecticut Application February 8, 1939, Serial No. 255,229

5 Claims. (Cl. 161—9)

This invention relates to timing mechanism and more particularly to a device to control an electric circuit or a fuel supply at a future time and for a specific duration.

It is a further object to provide a device in which a clock mechanism may be utilized to initiate the beginning of a circuit or fuel supply control at some future time but in which the duration of the circuit or fuel supply may be determined independent of the clock.

It is a further object to provide a device which may be applied either to electric current control or fuel control as for example gas control with the greatest ease and which will function perfectly with either use.

This application is in part a continuation of my allowed application Serial Number 729,755 filed June 9, 1934.

The device is generally applicable but for convenience it will be here illustrated as applied to the turning of an oven, either gas or electric, on and off as required.

Devices which are intended to start and stop an oven at a future time and in which the two operations are successively controlled directly by single clock mechanism, are clumsy to operate. For example, if a housewife desires to turn on the oven for an hour and ten minutes to have dinner ready at 7:15, it requires a problem in arithmetic for her to compute the time for the opening of the switch or valve and for closing it and the matter is still further complicated if she desire to change the setting.

It is an object of this invention to provide a device in which the duration of the operation and the time of its beginning are set independently of each other and are both clearly visible upon the dials.

Difficulty may be experienced in timing mechanism in which a circuit control is effected directly by the time indicating clock, if that clock itself be an electric clock, for in such instance any power lapse will seriously effect the cooking arrangements without the housewife being advised of the disturbance; thus for example, if the cooking is done by an electrically controlled gas range, a power lapse of fifteen minutes after the cooking starts would mean, if a self starting clock be used, that the cooking would continue for fifteen minutes longer than was intended, and if a non- self starting motor be used, it would mean that the power would not automatically be turned off at all.

It is an object of this invention to provide a device in accordance with which the cycle of operations is determined by a clock which may, if desired, be an electric clock but in which the timing of the operating sequence, for example, the timing of the duration of the cooking, is determined by another mechanism capable of operation independent of the time indicating clock.

The invention accordingly comprises the features of construction, combinations of elements, and arrangements of parts, which will be exemplified in the construction hereinafter set forth and the scope of the application of which will be indicated in the claims.

For a fuller understanding of the nature and objects of the invention reference should be had to the foregoing detailed description taken in connection with the accompanying drawings, in which:

Fig. 6 is a front elevation of the gas valve, a portion of the invention.

Fig. 7 is a side elevation of the same.

Fig. 8 is a section on the line 8—8 of Fig. 6.

Fig. 9 is a section similar to Fig. 8 with some parts not in section.

Fig. 10 is a plan of the electric switch portion of the invention.

Figs. 11, 12 and 13 are sections on the line A—A of Fig. 10 looking in the direction of the arrows showing the switch in different operating positions.

Fig. 14 is a section on the line B—B of Fig. 10 looking in the direction of the arrows.

Figure 1:
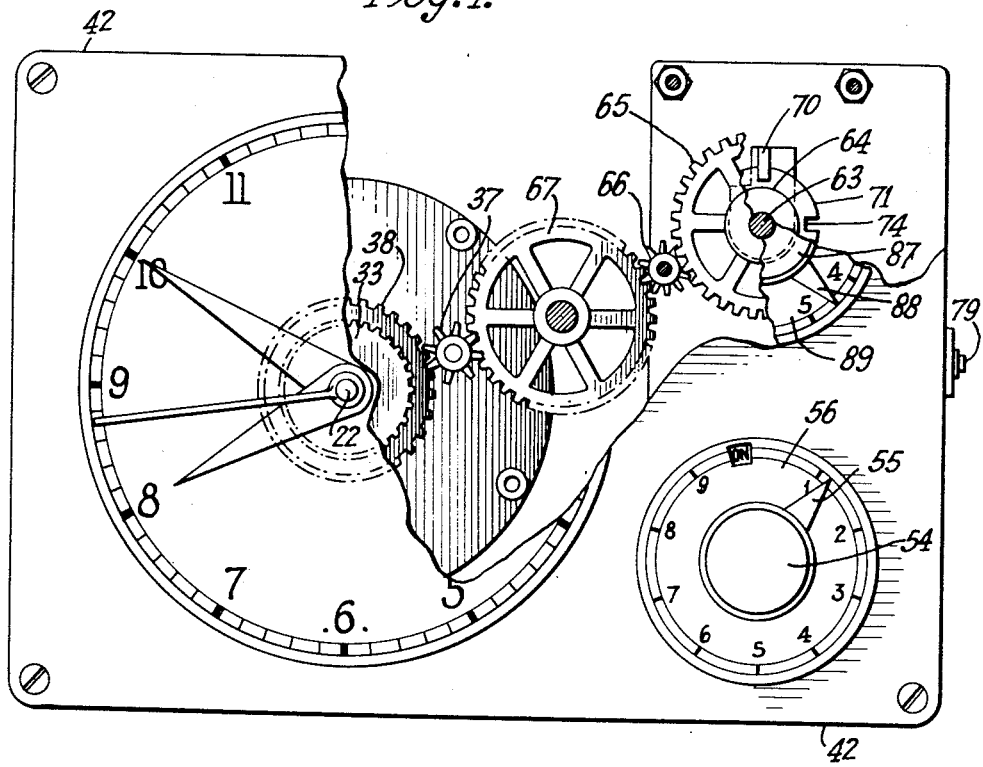
Fig. 1 is a front elevation of a device embodying the invention, parts being broken away.
Figure 2:
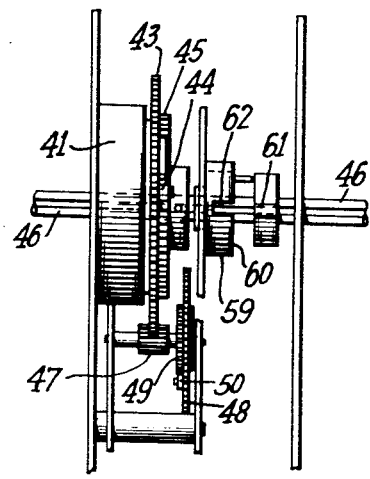
Fig. 2 is a plan view looking up from bottom, showing the timing stopping mechanism.
Figure 3:
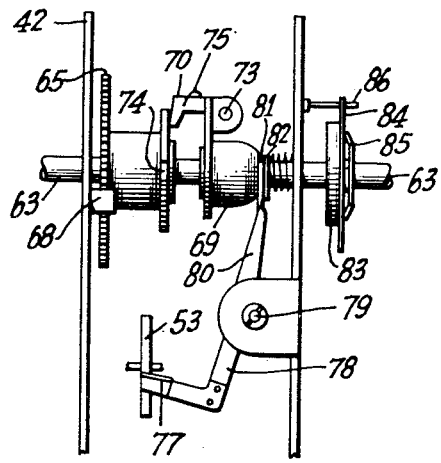
Fig. 3 is a side elevation of a detail showing the timing starting mechanism.
Figure 4:
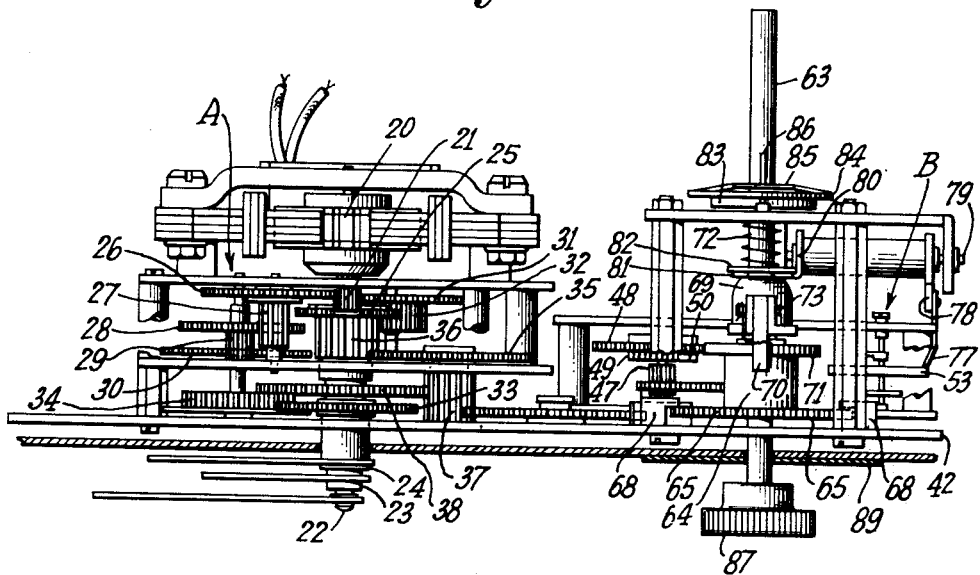
Fig. 4 is a top plan view of a device embodying the timing features of the invention.

This device consists primarily of a time indicating clock train A, a duration indicating time train B and mechanism C operated by the first mentioned clock train for turning on the power whether it be electricity or gas and mechanism operated by the duration train B for turning off the power.

The time indicating clock train is here shown as a synchronous clock movement having an electric motor 20, a pinion 21, a minute shaft 22, an hour shaft 23 which is hollow and concentric with the shaft 22 and a seconds shaft 24 which is also hollow and concentric with the shafts 22 and 23. The shaft 22 is driven by a gear train which drives the gear 25 fixed on the shaft 22. This gear train is conventional and portions of it are omitted for the sake of clarity but it is represented in the drawings by gears and pinions 21, 26, 27, 28, 29 and 30 meshing through gears not shown with a gear 31 carrying a pinion 32 which drives the gear 25 as above described. The seconds shaft 24 has mounted upon it a gear 33 driven from a gear 34 fixed upon one of the intermediate shafts of the train so as to drive the seconds shaft sixty times as fast as the minute shaft. The hour shaft is driven from the minute shaft by back gears 35 driven by pinion 36 fixed on the gear 25 and which in turn carries a pinion 37 driving gear 38 on the hour shaft.

The time duration train is represented by a spring 40 having one end in slipping driving connection to a barrel 41 fixed upon the frame 42 of the device and having its other end connected to a gear 43 which is connected by a pawl 44 to a ratchet 45 splined upon a shaft 46.

The gear 43 is in mesh with a pinion 47 which drives a gear 48 by means of a ratchet 49 and a pawl 50 and this gear 48 through other gears not shown drives an escapement wheel 51 which is released by an escapement 52 under control of a balance wheel 53. The shaft 46 is provided with a knob 54 having an indicating finger 55 moving over a dial 56. The member 57 represents a pinion upon the shaft of the escapement wheel 52 by which it is driven and the member 58 is the balance wheel spring.

The gear train of the duration mechanism is so arranged that the gear 43 moves counterclockwise to drive the escapement and the ratchet 45 and pawl 44 is so arranged as to permit the spring 40 to be wound by clockwise rotation of the shaft 46. Thus starting with the indicating finger 55 at any initial position in clockwise rotation and the shaft 46 will wind the spring 40 and the release of the shaft 46 will permit the gradual return of the indicating finger to the initial position under control of the escapement. As shown, the initial position is marked zero on the dial and is at the point where the 12 appears upon a clock dial so that all of the other numbers 1, 2, 3, etc. appear at their normal position on the dial. It results that on rotation of the indicating finger to 1 or 2 or any other number the duration mechanism will be caused to operate for one or two hours or for any other number of hours indicated by the position at which the hand is left.

A circular block 59 concentric with the shaft 46 has a circumferential surface 60 adapted to be engaged by a finger 61 fixed upon the shaft 46 to prevent endwise movement of the shaft 46 but at one point corresponding to the zero position of the finger 55 the block is provided with a recess 62 having sharply defined edges to receive the finger 61 and permit such endwise movement. The shaft 46 is caused to make this movement by a spring on other portions of the mechanism which will be later described. The means for controlling the action of the time duration train from the indicating train is as follows. A shaft 63 is slidably mounted in the frame 42 and a block 64 surrounds this shaft and carries a gear 65 meshing with a pinion 66 and a gear 67 and with the minute hand reduction pinion 37. The ratio of the gears being such that the gear 65 makes one revolution for each revolution of the hour hand. Lugs 68 prevent endwise movement of the gear 65 while permitting rotation thereof.

Figure 5:
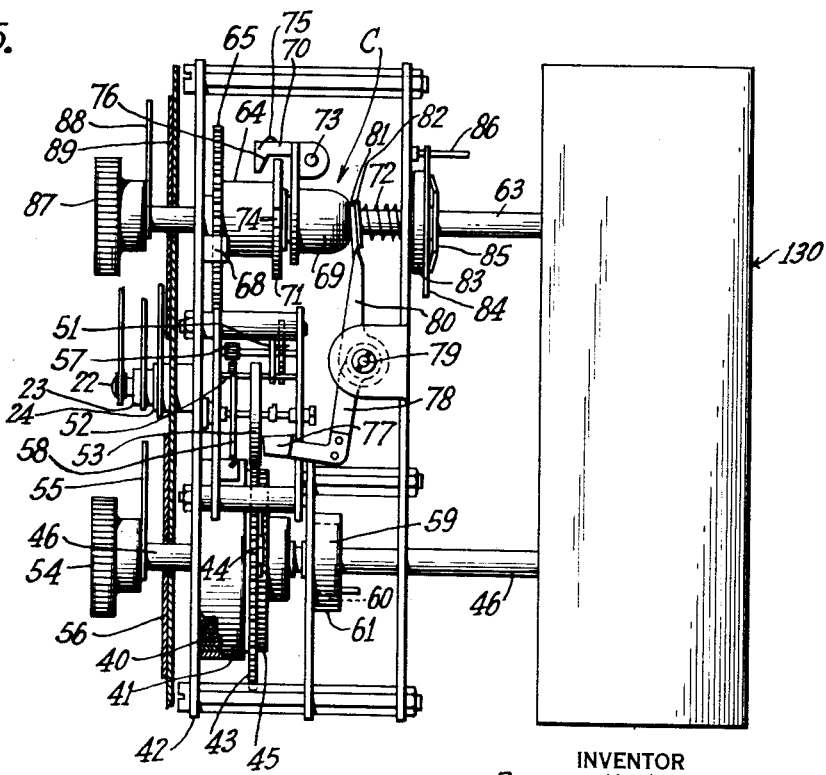
Fig. 5 is a side elevation.

Fixed upon the shaft 63 is a block 69 carrying a finger 70 and on the block 64 there is provided a circumferential surface 71 around which the finger 70 may be caused to travel as the shaft 63 and the block 64 move relative to each other. A spring 72 surrounding the shaft 63 engages through intermediate parts the block 69 to urge the shaft 63 toward the left as seen in Figure 5 and the shaft of the finger 70 and its engagement with the surface 71 is such that the thrust of the spring 72 is in line with the pivot 73 of the finger 70 so that this finger bearing against the surface 71 can resist the endwise movement of the shaft 63. At one point, however, as shown at 74 an opening is provided in the surface 71 of such size and shape as to receive the finger 70 and permit such endwise movement. The finger 70 is pivoted at 73 and urged inward by a spring 75 and carries an inward cam surface 76 so that it can move to the left as shown in Figure 5 only when the finger 70 is opposite the opening 74 but that it can be moved to the right at any position since if the finger 70 is not opposite the opening 74 the cam surface 76 will swing the finger 70 about its pivot 73 outwardly beyond the edge of the surface 71 until it passes that surface.

A spring finger 77 is carried by a lever 78 in position to obstruct the movement of the time duration train or to move out of obstructing position to permit the movement of that train. In the particular embodiment here shown the spring finger 77 engages the surface of the balance wheel just heavily enough to prevent its oscillation and it moves from that position to a lower position in which it frees the balance wheel. The lever 78 is pivoted at 79 and has a second arm 80 carrying a fork 81 resting between the block 89 and a washer 82 engaged by the spring 72, the parts being so proportioned that the endwise movement of the shaft previously referred to moves the spring finger 77 into and out of engagement with the balance wheel.

In order to impose a standard minimum friction upon the rotation of the shaft 63 there is mounted upon the shaft a disc 83 and a disc 84 loose upon the shaft 63 is spring pressed against this disc 83 by a spring disc washer 85. The disc 84 being held against rotation by a pin 86 fast upon the frame of the device with which the disc 84 slidably engages.

The shaft 63 is under the control of a knob 87 carrying an indicating finger 88 moving over a dial 89.

With this construction it will be clear that the recess 74 has its position at all times determined by the setting of the time indicating train and the finger 70 has its position determined at all times by the setting of the finger 88. Thus when the finger 88 is set to any given hour the finger 70 and the opening 74 will be out of registry until the setting of the time indicating train is identical with the setting of the finger 88.

This mechanism is adapted for control of a range or other apparatus whether that apparatus utilize gas or electricity as its source of power.

The construction of Figures 6, 7, 8 and 9 comprises that portion of the apparatus designed for the control of gas and the construction of Figures 10, 11, 12, 13 and 14 show a similar construction applied to the control of an electric device.

In the construction of the gas devices there are provided two valves arranged in the gas supply line in sequence. One of these valves is spring pressed closed and one of them is spring pressed open. The latter being controlled by the shaft 63 and the former by the shaft 46. As illustrated, there is provided a casing 90 having a globe type of valve seat 91 and a valve 92 having a washer 93 is urged against said valve seat by a spring 94. The valve 92 may be guided in its motion to and from the seat by a stud 95 fitting within a corresponding recess 96 in the valve. A stem 97 is slidable within a packing member 98 to engage the valve as shown at 99 so that depression of the stem 97 will push the valve away from its seat and release of the stem will permit the spring 94 to close the valve.

For convenience the stud 95 is carried upon a cap 100 screwed into the casing 90 to permit ready access to the interior of the parts.

At another portion of the casing there is provided a second valve seat 101 cooperating with a second valve 102 having a washer 103 and a spring 104 is arranged to press the valve 102 away from its seat.

This valve, as shown, has depending from it a hollow stud 105 fitting within a recess 106 in a cap 107 to serve as a guide for the valve.

A stem 110 carried within a packing 111 in the casing is so arranged as to press the valve closed but to account for possible variation it is desirable that this pressure shall be resilient. To this end the stud 105 is provided with a recess 112 within which there is a plate 113 between which and a screw 114 there is confined a spring 115. This plate 113 is in position to be engaged by the stem 110 and the spring 115 is of sufficient tension to overcome the spring 104 so that a depression of the stem 110 will close the valve. Nevertheless if the valve encounters the valve seat slightly before the end of the movement of the stem 110 the spring 115 will permit such additional movement as is necessary while still maintaining the valve in closed position.

The casing is provided with suitable passages 120, 121, 122 for permitting the gas to flow clear through the device whenever both valves are open but shutting off the gas completely when either valve is closed.

It will be understood that the stems 97 and 110 are spaced from each other the same as the shafts 46 and 63 and the casing is so mounted relative to the timing mechanism that the valves 92 and 102 will both be moved to the left as seen in Figure 8 when the shafts 46 and 63 are moved to the left in which position the valve 92 will be closed and the valve 102 will be opened but the depression of either knob 87 or 54 will operate its corresponding valve to the opposite position.

The operation of the mechanism will be clear from the above description.

The knob 87 is depressed and this depression closes the valve 101 and at the same time brings the finger 70 on the right hand side of the surface 71. A rotation of the knob 87 rotates the finger 70 to a position corresponding to the position of the recess 74 at the time indicated by the finger 88. At the same time the depression of the knob has moved the lever 78 to obstruct the balance wheel 53 to prevent operation of the duration time train.

The knob 54 may now be depressed and rotated clockwise to the hour which indicates the number of hours that the power is to remain on. This rotation winds the clock spring 40 and thereby conditions the time duration train for operation. This operation is, however, restrained by the finger 77.

The depression of the knob opens the valve 92 leaving the gas supply shut off under control of the valve 102. The mechanism remains in this condition with the surface 71 rotating with the time indicating train until at the predetermined time the shaft 63 is released opening the valve 102, as previously described, starting the oven going. It being understood that a pilot light or some form of automatic starter is present. As soon as the valve 102 opens, however, it releases the time train for operation and the shaft 46 rotates under the action of the time duration train until the finger 61 comes opposite the recess 62, whereupon the spring 94 urges the stem 97 endwise forcing the finger 61 into the recess 62, stopping the movement of the clock. Thus the gas supply is opened at the time indicated by the finger 88 and is closed after a lapse of time corresponding to the initial setting of the finger 55.

The construction shown in Figures 10, 11, 12, 13 and 14 shows the electric circuit operating portions of the device. The numeral 130 represents a casing of an insulating material having at each side a supporting block 131, 132 and on each of these supporting blocks is a quadrant shaped spring finger 133—134. These fingers having their curvature toward each other being offset as shown in Figure 11 so as to have their ends lie one above the other as shown in Figure 11. Each of these fingers is provided with a metallic contact block 135—136 which may be brought into contact by flexing one of the spring fingers but which are normally free from contact.

On each of these spring fingers there is provided a socket block 137—138 spaced apart the same distance as the shafts 46 and 63 of the timing device and beneath each of these sockets there is preferably provided a coil spring 139—140. In the center of the device there is provided a pair of contacts 141—142 arranged in the form of a conventional socket adapted to receive the conventional form of two prong plug. A contact 141 is connected by a suitable wire 143 and the spring finger 133 and the contact 142 is connected by a suitable wire 144 with the spring finger 134. As will be understood the contacts 141—142 are connected in series with the current supply to the electrical device which the switch is intended to control. The casing 130 is so mounted that the shaft 63 extends into the socket block 137 and the shaft 46 into the socket block 138, the switch mechanism being so spaced from the timing mechanism that when both of the shafts 46 and 63 are moved to the left as far as they will go the contacts 135—136 are in the position shown in Figure 11. As soon, however, as the shafts are depressed to set the mechanism the two contacts assume the position shown in Figure 13. In both these positions the circuit is open. As soon, however, as the shaft 63 moves to the left when the recess 74 comes opposite the finger 70 the contact 135 is thrown outwardly either by the resiliency of the spring finger 133 or of the spring 139 or both to make contact as shown in Figure 12. As soon as the shaft 46 is rendered free to move by reason of registry of the finger 61 and recess 62 the contact finger 134 also springs out opening the circuit and restoring the switch mechanism to its normal position.

With this construction it will be clear that once the timing mechanism, that is the time duration train, is started in operation the clock mechanism no longer controls. Once the oven cooking is started the clock mechanism has nothing to do with the cooking time and even stoppage of the clock mechanism will not effect cooking hours. In many cases delayed cooking will not be desired and this mechanism lends itself readily to such situations as the housewife simply pushes in the knob controlling the timing mechanism and sets it to the desired number of hours. This turns on the oven or stove and as time goes on the dial of the timing mechanism moves, always showing the number of remaining cooking hours. Thus if she has set the device to cook a roast for 1½ hours and after it has cooked one hour she reaches the conclusion that the remaining one-half hour is not enough to finish it, she can re-set it so that it will cook an hour from that time instead of one-half hour.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent, is:

1. A device for controlling the flow of an energy possessing medium and having flow starting and flow stopping mechanisms comprising an electrically driven time train and indicating hands driven thereby, a flow stopping shaft rotatable from an initial position, an escapement controlled spring driven time train for returning said flow stopping shaft to its initial position at a controlled rate, a flow starting shaft, a cam member, said starting shaft and cam comprising two elements rotatable with regard to each other, one element being manually rotatable for setting purposes and means driven by the electrically driven time train for continuously driving the other element, means for urging said starting shaft endwise, cooperating devices upon said starting shaft and cam to permit endwise movement of said shaft in one point in the relative rotative position of said elements and means upon said starting shaft to restrain movement of said escapement controlled time train, except when said flow starting shaft is moved endwise, means connected to said flow starting shaft to be operated by said endwise movement to start the flow of said medium and means operated by the power stopping shaft to stop the flow when said flow stopping shaft reaches its initial position.

2. A device according to claim 1 having a member restraining endwise movement of said flow stopping shaft except at its initial position but permitting such endwise movement at such initial position and having means to urge said stopping shaft endwise and in which the said endwise movement operates the stopping of the flow.

3. A device according to claim 1 having a member restraining endwise movement of said flow stopping shaft except at its initial position but permitting such endwise movement at such initial position and having means to urge said stopping shaft endwise and in which the said endwise movement operates the stopping of the flow and in which the flow starting and flow stopping mechanism comprise a pair of members, one of which, spring pressed outwardly to start the flow of power, is connected to said flow starting shaft and one of which spring pressed outwardly to stop the flow, is connected to said power stopping shaft.

4. A device according to claim 1 having a member restraining endwise movement of said flow stopping shaft except at its initial position but permitting such endwise movement at such initial position and having means to urge said stopping shaft endwise and in which the said endwise movement operates the stopping of the flow and in which the flow starting and flow stopping mechanisms comprise a pair of valves in series in a gas main, one of said valves having a stem and being spring pressed outwardly to open, said stem being connected with said flow starting shaft and the other of said valves having a stem and being spring pressed outwardly to close, said stem and said last mentioned valve being connected to said flow stopping shaft, whereby said first mentioned valve can operate only when said flow starting shaft and its cam are at said one point in their relative position and said second mentioned valve can operate only when said flow stopping shaft has returned to its initial position.

5. A device according to claim 1 having a member restraining endwise movement of said flow stopping shaft except at its initial position but permitting such endwise movement at such initial position and having means to urge said stopping shaft endwise and in which the said endwise movement operates the stopping of the flow and in which the flow starting and flow stopping mechanisms comprise a pair of spring arms carrying contacts, one of said arms being positioned to be engaged by said flow starting shaft to be held by said shaft with said contacts separated but to permit said spring arm to move to contact position when said flow starting shaft is at said one position of relative movement and the other of said spring arms being positioned to be engaged by said flow stopping shaft to be held in position with said contacts in engagement until said flow stopping shaft reaches said initial position.

RICHARD H. WHITEHEAD.